United States Patent [19]
Jones et al.

[11] Patent Number: 5,646,855
[45] Date of Patent: Jul. 8, 1997

[54] WAYPOINT NAVIGATION USING EXCLUSION ZONES

[75] Inventors: Gregory B. Jones, Tiverton; Christopher Shaw, Portsmouth; Stacy J. Hills, Tiverton, all of R.I.

[73] Assignee: The United States of America as represented by the Secretary of the Navy, Washington, D.C.

[21] Appl. No.: 504,374

[22] Filed: Jul. 19, 1995

[51] Int. Cl.$^6$ ........................................ G05D 1/00
[52] U.S. Cl. ........................................ 364/448
[58] Field of Search ................... 364/448, 449.1, 364/449.4, 449.3, 449.2, 460, 452, 462, 444.1, 444.2, 447

[56] References Cited

U.S. PATENT DOCUMENTS

| | | | |
|---|---|---|---|
| 4,442,432 | 4/1984 | Quigley | 343/394 |
| 4,692,869 | 9/1987 | King et al. | 364/448 |
| 4,939,661 | 7/1990 | Barker et al. | 364/443 |
| 4,999,782 | 3/1991 | BeVan | 364/448 |
| 5,268,844 | 12/1993 | Carver et al. | 364/443 |
| 5,274,551 | 12/1993 | Corby, Jr. | 364/413.13 |
| 5,323,306 | 6/1994 | Storli et al. | 364/452 |
| 5,404,648 | 4/1995 | Taylor, Jr. | 33/431 |
| 5,450,329 | 9/1995 | Tanner | 364/449 |
| 5,543,802 | 8/1996 | Villevieille | 342/357 |
| 5,559,707 | 9/1996 | DeLorme et al. | 364/443 |
| 5,566,288 | 10/1996 | Koerhsen | 395/142 |
| 5,581,259 | 12/1996 | Schipper | 342/451 |
| 5,592,382 | 1/1997 | Colley | 364/449.1 |

*Primary Examiner*—Kevin J. Teska
*Assistant Examiner*—Stephen J. Walder, Jr.
*Attorney, Agent, or Firm*—Michael J. McGowan; James M. Kasischke; Prithvi C. Lall

[57] ABSTRACT

A method is provided for navigating a vehicle. Waypoint exclusion zones are defined as circles whose centers are known-position waypoints. The vehicle is steered along a path that is tangential to the "current" waypoint exclusion zone. This path that is maintained until a relative bearing between the vehicle and a center of the current waypoint exclusion zone is at least 90° if the path is left of the center of the current waypoint exclusion zone, and at most −90° if the path is right of the center of the current waypoint exclusion zone. When either of these conditions is met, the vehicle is located along the circle of the current waypoint exclusion zone. The vehicle is then advanced along the circle of the current waypoint exclusion zone until a heading of the vehicle matches a heading of a path that: is tangential to the "next" waypoint exclusion zone. When the heading of the vehicle matches the heading of the path that is tangential to the next waypoint exclusion zone, the next waypoint exclusion zone becomes the current waypoint exclusion zone for carrying out the steering, maintaining and advancing of the vehicle.

8 Claims, 3 Drawing Sheets

5,646,855

WAYPOINT NAVIGATION USING EXCLUSION ZONES

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION

(1) Field of the Invention

The present invention relates generally to navigation, and more particularly to a method of navigating using waypoints.

(2) Description of the Prior Art

Waypoint navigation provides a means of directing a vehicle along a pre-planned path. A waypoint is a single point in a coordinate system. Usually, waypoints use earth coordinates of latitude and longitude degrees. Optionally, a depth or elevation may also be specified. Other coordinate systems may be used when appropriate to the mission or vehicle.

Typically, a starting and ending point are specified along with one or more intermediate waypoints. The vehicle proceeds from the starting point to the first intermediate waypoint. When the vehicle reaches a waypoint, it then changes course and proceeds to the next waypoint in sequence. This continues until the final waypoint has been reached. While such "point-to-point" waypoint navigation is sufficient in many situations, there are several instances where a more controlled method of navigation is required. This is particularly important where an autonomous (unmanned) vehicle is being employed. Since there are control errors in any real vehicle, it is unlikely that the vehicle will exactly cross any specified waypoint. Instead, there is an undesirable tendency for the vehicle to pass close by the waypoint, and then once past the waypoint, turn around and approach the waypoint from the opposite direction. To avoid this, it is necessary to devise a test or tolerance condition to determine when the waypoint has been reached so that the vehicle can proceed on to the next waypoint. In addition, if the waypoint is marked by a physical object such as a buoy, the vehicle may hit the object if it is being directed to the waypoint. A simple way to avoid this situation is to set the waypoint at some distance away from the actual marker. However, if a previous condition has forced the vehicle off course, then the vehicle may approach the modified waypoint on a path that still contacts the marker.

SUMMARY OF THE INVENTION

Accordingly, it is an object of the present invention to provide a method of waypoint navigation that accounts for navigation error.

Another object of the present invention is to provide a method of waypoint navigation in which the waypoints are physical objects to be avoided.

Still another object of the present invention is to provide a method of waypoint navigation suitable for directing an autonomous underwater vehicle along a predetermined search pattern.

Other objects and advantages of the present invention will become more obvious hereinafter in the specification and drawings.

In accordance with the present invention, a method is provided for navigating a vehicle. A plurality of waypoint exclusion zones are defined such that each waypoint exclusion zone is a circle having a center and a radius where each center is a known-position waypoint. A predetermined travel plan is established to identify an ordered sequence of travel amongst the waypoint exclusion zones. A "current" waypoint exclusion zone in the ordered sequence identifies the waypoint exclusion zone to which the vehicle is currently headed, and a "next" waypoint exclusion zone in the ordered sequence identifies the waypoint exclusion zone to which the vehicle is headed after the current waypoint exclusion zone. The vehicle is steered along a path that is tangential to the current waypoint exclusion zone. This path that is maintained until a relative bearing between the vehicle and a center of the current waypoint exclusion zone is 1) equal to or greater than 90° if the path is left of the center of the current waypoint exclusion zone, or 2) equal to or less than −90° if the path is right of the center of the current waypoint exclusion zone, where angles are assumed to be positive and increasing in the clockwise direction. When either of these conditions is met, the vehicle is located along the circle of the current waypoint exclusion zone. The vehicle is then advanced along the circle of the current waypoint exclusion zone until a heading of the vehicle matches a heading of a path that is tangential to the next waypoint exclusion zone. When the heading of the vehicle matches the heading of the path that is tangential to the next waypoint exclusion zone, the next waypoint exclusion zone becomes the current waypoint exclusion zone for carrying the steering, maintaining and advancing of the vehicle as described above.

BRIEF DESCRIPTION OF THE DRAWING(S)

Other objects, features and advantages of the present invention will become apparent upon reference to the following description of the preferred embodiments and to the drawings, wherein.

DESCRIPTION OF THE PREFERRED EMBODIMENT(S)

Figure 1:
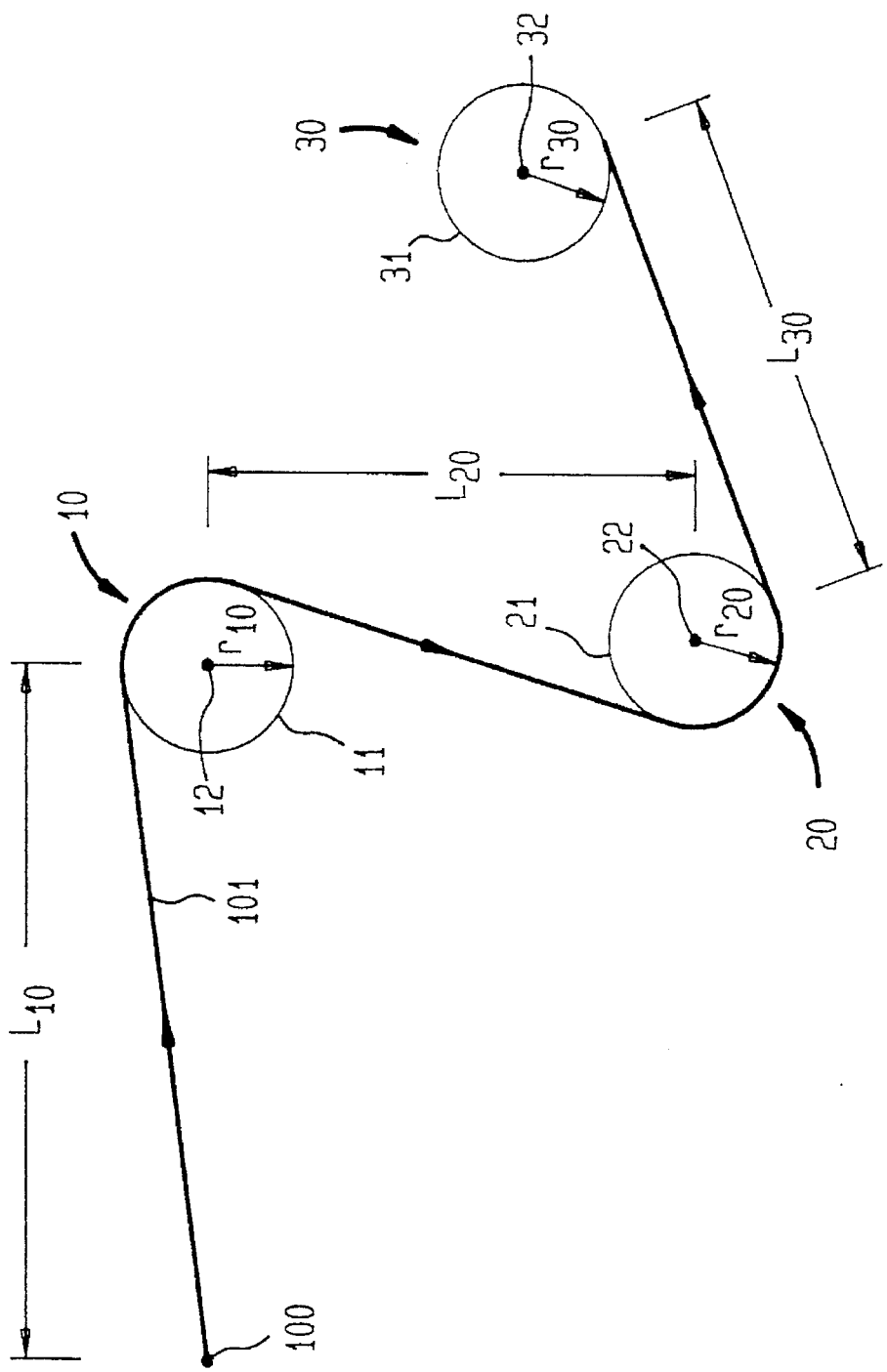
FIG. 1 is a diagrammatic view of plurality of waypoint exclusion zones and a travel plan for traveling amongst the waypoint exclusion zones in accordance with the present invention.

Referring now to the drawings, and more particularly to FIG. 1, a plurality of waypoint exclusion zones are designated generally by reference numerals 10, 20 and 30. Each of zones 10, 20 and 30 are defined as circles 11, 21 and 31, respectively. Each of circles 11, 21 and 31 have centers 12, 22 and 32 with respective radii $r_{10}$, $r_{20}$ and $r_{30}$. Of course, additional waypoint exclusion zones can be (and typically will be) provided. For purposes of the following description, it is assumed that none of the waypoint exclusion zones used by the present invention overlap in order to simplify the path planning technique. In addition, it should be understood that the present invention utilizes plane geometry for waypoint exclusion zones that are located on a spherical earth. While this does introduce error, the error is generally negligible or of little consequence.

Each of centers 12, 22 and 32 represents a waypoint, e.g., a known latitude and longitude in the earth's coordinate system. The radii $r_{10}$, $r_{20}$ and $r_{30}$ represent offset distances by which a vehicle (not shown), whose initial position for purposes of this description is indicated at point 100, will avoid the particular waypoint as it approaches same. The distance or range between waypoints, (i.e., the distance between centers of the circles that are the waypoint exclusion zones) along predetermined travel path 101 are given as $L_{10}$, $L_{20}$ and $L_{30}$ where $L_{10}$ is the range between initial or starting position 100 and center 11, etc.

In brief, the method of the present invention requires that a vehicle approach each waypoint (e.g., centers 12, 22 and 32) on a path (e.g, path 101) tangent to the waypoint's exclusion zones (e.g., circles 11, 21 and 31). Thus, the vehicle never enters the exclusion zone surrounding a waypoint. This is particularly useful in situation where the waypoint is marked with a physical object such as a buoy.

The stepwise process of the present invention will be explained by way of example with continued reference to FIG. 1. Since an ordered sequence of travel amongst a given set of waypoint zones is known a priori, the turn direction (i.e., clockwise or counterclockwise) about each waypoint exclusion zone can be predetermined based on the particular sequence of travel and the relative positions between centers of the waypoint exclusion zones. If the turn direction is clockwise, path 101 is directed to the left of an approached waypoint. However, if the turn direction is counterclockwise, path 101 is directed to the right of an approached waypoint. More specifically, an absolute coordinate system is first chosen. For example, in FIG. 1, 0° is north, 90° is east, −90° is west, and, ±180° is south. A turn direction about a particular i-th waypoint exclusion zone is based on the angular difference $$\Psi_{i+1} - \Psi_i \quad (1)$$

where $\Psi_i$ is the bearing from the (i−1)-th waypoint exclusion zone center (or vehicle initial position) to the i-th waypoint exclusion zone center in terms of the absolute coordinate system, and $\Psi_{i+1}$ is the bearing from the (i−1)-th waypoint exclusion zone center to the (i+1)-th waypoint exclusion zone center in terms of the absolute coordinate system. When the difference ($\Psi_{i+1} - \Psi_i$) is between 0° and 180° the turn direction is clockwise When the difference ($\Psi_{i+1} - \Psi_i$) is between 0° and −180°, the turn direction is counterclockwise. If the difference ($\Psi_{i+1} - \Psi_i$) is exactly 0° or ±180° either a clockwise or counterclockwise turn direction can be used.

Figure 2:
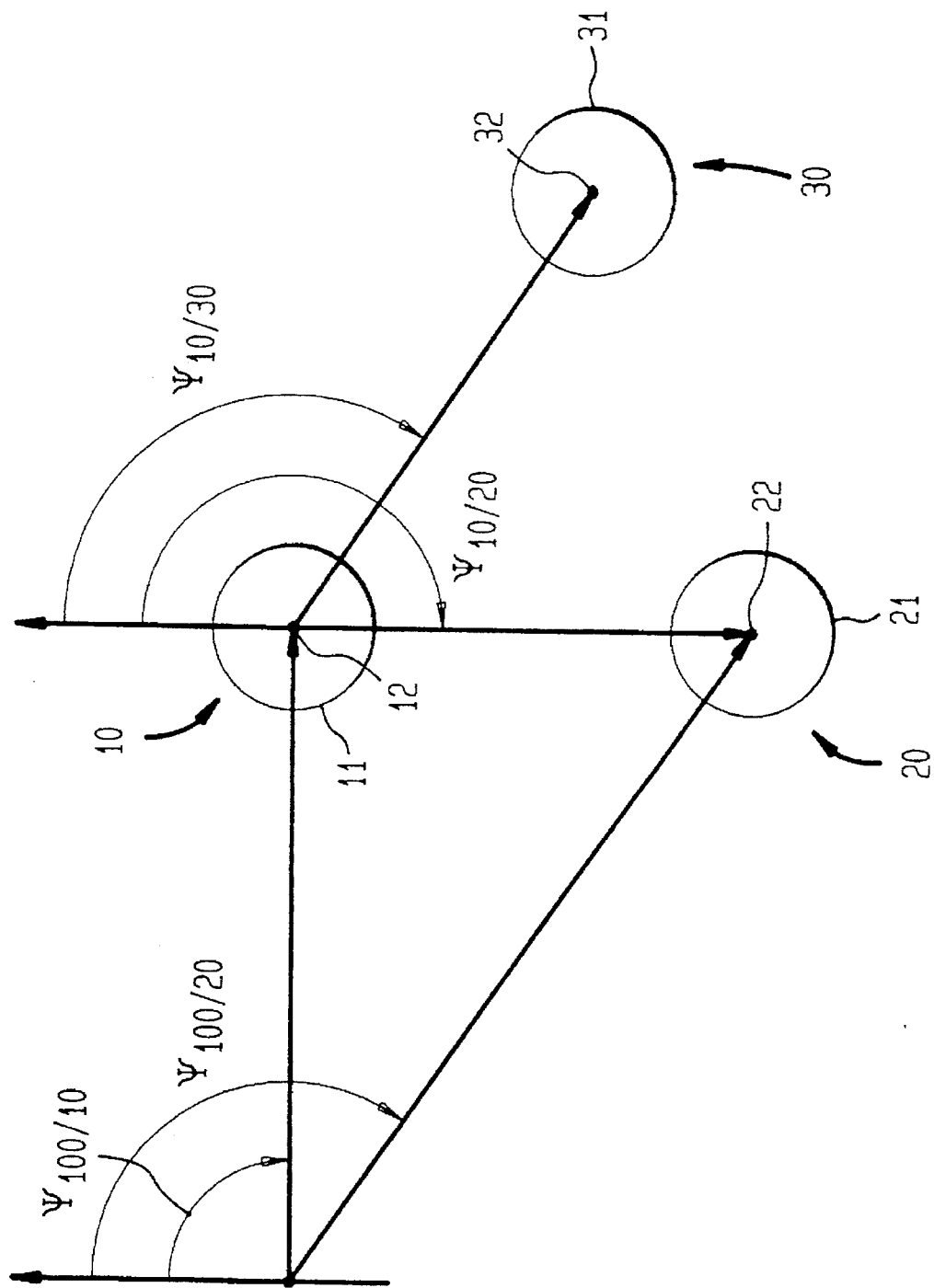
FIG. 2 is a diagrammatic view of the plurality of waypoint exclusion zones of FIG. 1 used for explaining how the turn direction about each waypoint exclusion zone is determined in accordance with the present invention.

The application of equation (1) to the example of FIG. 1 will now be explained with the aid of FIG. 2 where like reference numerals are used for those elements in common with FIG. 1. The 0° axis of the absolute coordinate system is drawn through each of initial point 100 and center 12 of waypoint exclusion zone 10. It is assumed that the travel plan will proceed from initial point 100 to each of waypoint exclusion zones 10, 20 and 30 in sequential fashion. The turn direction about waypoint exclusion zone 10 is determined from the angular difference $$\Psi_{100/20} - \Psi_{100/10} = 135° - 90° = 45°$$

which indicates that a clockwise turn is required about waypoint exclusion zone 10. The turn direction about waypoint exclusion zone 20 is determined from the angular difference $$\Psi_{10/30} - \Psi_{10/20} = (135° - 180°) = -45°$$

which indicates that a counterclockwise turn is required about waypoint exclusion zone 20. The turn direction about waypoint exclusion zone 30 (and any other subsequent waypoint exclusion zones in the ordered sequence) would be determined in a similar fashion.

The heading for a vehicle traveling each leg of path 101 (i.e., initial point 100 to waypoint exclusion zone 10, waypoint exclusion zone 10 to waypoint exclusion zone 20, etc.) is determined by one of the equations $$\Theta = \Psi_{vi} - \arcsin(r_i/L_i) \quad (2)$$

$$\Theta = \Psi_{vi} + \arcsin(r_i/L_i) \quad (3)$$

where $\Theta$ is the commanded heading of the vehicle to the current or i-th waypoint exclusion zone, $\Psi_{vi}$ is the bearing in the absolute coordinate system from the vehicle to the center of the i-th waypoint exclusion zone to which the vehicle is currently approaching, $r_i$ is the radius of the i-th waypoint exclusion zone, and $L_i$ is the range between the vehicle and the center of the i-th waypoint exclusion zone. Equation (2) is used when the turn direction about the i-th waypoint exclusion zone is clockwise, and equation (3) is used when the turn direction about the i-th waypoint exclusion zone is counterclockwise. As will be explained by way of example below, it is assumed herein that the vehicle traveling on path 101 is equipped to determine its actual heading as well as $\Psi_{vi}$ and $L_i$.

The vehicle is maintained along commanded heading $\Theta$, i.e., path 101, until such time that the vehicle's "relative" bearing to the center of the i-th waypoint exclusion zone or $\Psi''_{vi}$ is either: 1) equal to or greater than 90° if path 101 is to pass to the left of the center of the i-th waypoint exclusion zone which is indicative of a clockwise turn direction, or 2) equal to or less than −90° if path 101 is to pass to the right of the center of the i-th waypoint exclusion zone which is indicative of a counterclockwise turn direction. The vehicle's relative bearing $\Psi''_{vi}$ is the angular difference between the vehicle and some point, e.g., the center of the i-th waypoint exclusion zone, in relative coordinates. For example, relative coordinates could be defined as 0° along the vehicle commanded heading, 90° to the right of the vehicle's commanded heading, etc.

Once the vehicle's relative bearing $\Psi''^{i} = \pm 90°$, the i-th waypoint is considered "achieved". To "complete" the current or i-th waypoint exclusion zone, the vehicle must be directed to the path that will take it to the next or (i+1)-th waypoint exclusion zone. Accordingly, the vehicle is advanced along the circle about the i-th waypoint exclusion zone until its actual measured heading in the absolute coordinate system matches or is equal to $$\Psi_{v(i+1)} - \arcsin(r_{(i+1)}/L_{(i+1)}) \quad (4)$$

or $$\Psi_{v(i+1)} + \arcsin(r_{(i+1)}/L_{(i+1)}) \quad (5)$$

where $\Psi_{v(i+1)}$ is the bearing in the absolute coordinate system from the vehicle to the center of the next or (i+1)-th waypoint exclusion zone, $r_{(i+1)}$ is the radius of the (i+1)-th waypoint exclusion zone, and $L_{(i+1)}$ is the range between the vehicle and the center of the (i+1)-th waypoint exclusion zone. Equation (4) is used when the turn direction about the (i+1)-th waypoint exclusion zone is clockwise, and equation (5) is used when the turn direction about the (i+1)-th waypoint exclusion zone is counterclockwise. One of equations (4) or (5) is repetitively calculated when the vehicle advances on the circle around the i-th waypoint exclusion zone. Once the actual measured heading of the vehicle matches that calculated by either of equations (4) or (5), the vehicle has "completed" the waypoint. At this point, the current or i-th waypoint exclusion zone becomes what previously was the next or (i+1)-th waypoint exclusion zone. The vehicle's commanded heading 73 can then be determined in accordance with either equation (2) or (3) and navigation continues in a similar fashion to that described above.

Figure 3:
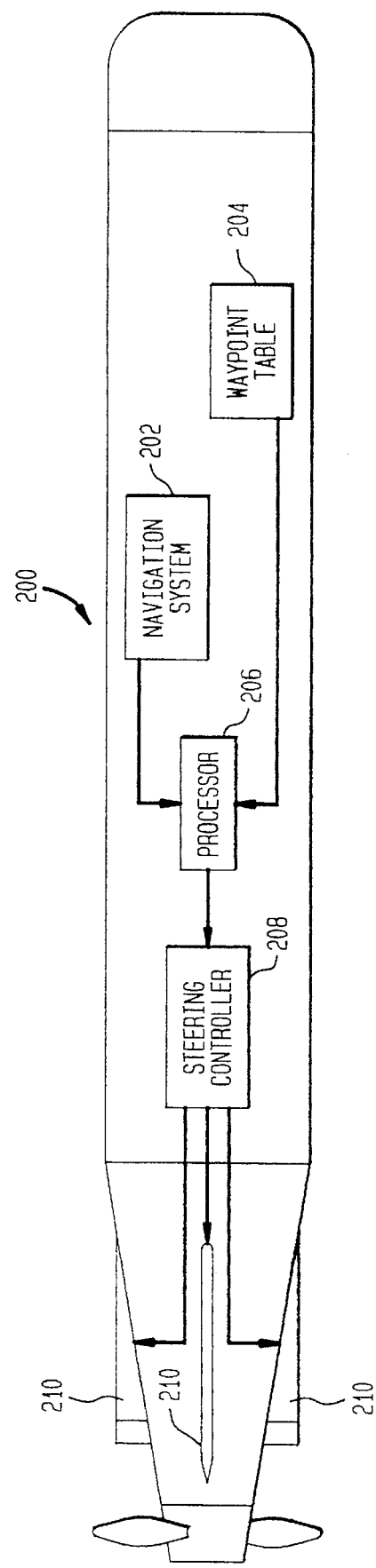
FIG. 3 is a schematic view of an example of a vehicle that can navigate according to the present invention.

As mentioned above, it is assumed that the vehicle operating in accordance with the present invention would have certain capabilities. By way of example, one such vehicle is an unmanned underwater vehicle shown schematically in FIG. 3. Vehicle 200 would typically be equipped with navigation system 202, waypoint table 204, processor 206, steering controller 208 and control surfaces 210. Navigation system 202 can be any conventional system (e.g., inertial navigation system, global positioning system, etc.) capable of determining "own position" in the absolute coordinate system. Waypoint table 204 stores a sequential list of waypoints and exclusion zones in an absolute coordinate system. Processor 206 is any conventional programmable processor capable of performing the calculations required by the present invention in order to generate vehicle heading or steering commands for steering controller 208. In turn, steering controller 208 controls movement of control surfaces 210 in order to appropriately steer vehicle 200.

The advantages of the present invention are numerous. The method navigates a vehicle towards a waypoint in such a way that the waypoint is reached, but not actually contacted. This is important where the waypoint is a physical object. For vehicles with precise navigation capabilities and little or no human control over their course, this method allows the vehicle to navigate toward the waypoint while preventing it from hitting the object. Another important feature of the method is that while it keeps the vehicle from contacting the waypoint, it is independent of the angle at which the vehicle approaches the waypoint, Thus, if the vehicle is forced off course by tidal currents, an avoidance maneuver, or some other event; the vehicle will still navigate to, but not hit, the waypoint. This method also serves as a way to specify a path "pattern" to be followed by a vehicle in either direction using the same set of waypoints.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A method of navigating a vehicle, comprising the steps of:

providing a plurality of waypoint exclusion zones, each of said plurality of waypoint exclusion zones defined as a circle having a center and a radius, each said center being a known-position waypoint;

providing a predetermined travel plan for the vehicle that identifies an ordered sequence of travel amongst said plurality of waypoint exclusion zones;

determining a turn direction about each of said plurality of waypoint exclusion zones based on said ordered sequence of travel and relative positions between centers of said plurality of waypoint exclusion zones;

steering the vehicle along a path that is tangential to an i-th waypoint exclusion zone of said ordered sequence of travel, said path that is tangential to said i-th waypoint exclusion zone being a path calculated to one of two possible tangents points of said i-th waypoint exclusion zone based on a turn direction determined for said i-th waypoint exclusion zone;

maintaining said path that is tangential to said i-th waypoint exclusion zone until said vehicle is at least at said calculated tangent point of said i-th waypoint exclusion zone, wherein the vehicle is located along said circle of said i-th waypoint exclusion zone; and advancing the vehicle along said circle of said i-th waypoint exclusion zone until a heading of the vehicle matches a heading of a path that is tangential to an (i+1)-th waypoint exclusion zone in said ordered sequence of travel, said path being tangential to one of two possible tangent points on said (i+1)-th waypoint exclusion zone based on a turn direction calculated for said (i+1)-th waypoint exclusion zone wherein, when said heading of the vehicle matches said heading of said path that is tangential to said (i+1)-th waypoint exclusion zone, said (i+1)-th waypoint exclusion zone becomes said i-th waypoint exclusion zone for carrying out said steps of steering, maintaining and advancing.

2. A method according to claim 1 wherein none of said plurality of waypoint exclusion zones overlap.

3. A method according to claim 1 wherein said step of determining said turn direction about each of said plurality of waypoint exclusion zones comprises the steps of:

providing an absolute coordinate system; and calculating, for each said i-th waypoint exclusion zone, an angular difference between a bearing from a center of an (i−1)-th waypoint exclusion zone to said center of said (i+1)-th waypoint exclusion zone and said bearing from said center of said (i−1)-th waypoint exclusion zone to said center of said i-th waypoint exclusion zone in terms of said absolute coordinate system, wherein said angular difference is indicative of one of a clockwise or counterclockwise turn direction.

4. A method according to claim 3 wherein said step of steering includes the step of determining said path that is tangential to said i-th waypoint exclusion zone in accordance with the equation $$\Psi_{v,i} - \arcsin(r_i/L_i)$$

when said angular difference indicates said clockwise turn direction, and in accordance with the equation $$\Psi_{v,i} + \arcsin(r_i/L_i)$$

when said angular difference indicates said counterclockwise turn direction, wherein $\Psi_{v,i}$ is a bearing from the vehicle to said center of said i-th waypoint exclusion zone in terms of said absolute coordinate system, $r_i$ is said radius of said i-th waypoint exclusion zone, and $L_i$ is the range between the vehicle and said center of said i-th waypoint exclusion zone.

5. A method according to claim 3 wherein said heading of said path that is tangential to said (i+1)-th waypoint exclusion zone is determined in accordance with the equation $$\Psi_{v(i+1)} - \arcsin(r_{(i+1)}/L_{(i+1)})$$

when said angular difference indicates said clockwise turn direction, and in accordance with the equation $$\Psi_{v(i+1)} + \arcsin(r_{(i+1)}/L_{(i+1)})$$

when said angular difference indicates said counterclockwise turn direction, wherein $\Psi_{v(i+1)}$ is a bearing from the vehicle to said center of said (i+1)-th waypoint exclusion zone in terms of said absolute coordinate system, $r_{(i+1)}$ is said radius of said (i+1)-th waypoint exclusion zone, and $L_{(i+1)}$ is the range between the vehicle and said center of said (i+1)-th waypoint exclusion zone.

6. A method of navigating a vehicle, comprising the steps of:

providing a plurality of waypoint exclusion zones, each of said plurality of waypoint exclusion zones defined as a circle having a center and a radius, each said center being a known-position waypoint;

providing a predetermined travel plan for the vehicle that identifies an ordered sequence of travel amongst said plurality of waypoint exclusion zones, wherein a current waypoint exclusion zone in said ordered sequence of travel identifies one of said plurality of waypoint exclusion zones to which the vehicle is currently headed, and wherein a next waypoint exclusion zone in said ordered sequence of travel identifies one of said plurality of waypoint exclusion zones to which the vehicle is headed after said current waypoint exclusion zone;

steering the vehicle along a path that is tangential to said current waypoint exclusion zone;

maintaining said path that is tangential to said current waypoint exclusion zone until a relative bearing between the vehicle and a center of said current waypoint exclusion zone is at least 90° if said path that is tangential to said current waypoint exclusion zone is left of said center of said current waypoint exclusion zone, and at most −90° if said path that is tangential to said current waypoint exclusion zone is right of said center of said current waypoint exclusion zone, wherein the vehicle is located along said circle of said current waypoint exclusion zone; and advancing the vehicle along said circle of said current waypoint exclusion zone until a heading of the vehicle matches a heading of a path that is tangential to said next waypoint exclusion zone wherein, when said heading of the vehicle matches said heading of said path that is tangential to said next waypoint exclusion zone, said next waypoint exclusion zone becomes said current waypoint exclusion zone for carrying out said steps of steering, maintaining and advancing.

7. A method according to claim 6 wherein none of said plurality of waypoint exclusion zones overlap.

8. A method according to claim 6 wherein said path that is tangential to said current waypoint exclusion zone is determined in accordance with the equation $$\Psi - \arcsin(r/L)$$

when said path that is tangential to said current waypoint exclusion zone is left of said center of said current waypoint exclusion zone, and in accordance with the equation $$\Psi + \arcsin(r/L)$$

when said path that is tangential to said current waypoint exclusion zone is right of said center of said current waypoint exclusion zone, wherein $\Psi$ is a bearing from the vehicle to said center of said current waypoint exclusion zone in terms of an absolute coordinate system, r is said radius of said current waypoint exclusion zone, and L is the range between the vehicle and said center of said current waypoint exclusion zone.

* * * * *